United States Patent
Koki

(10) Patent No.: US 9,429,444 B2
(45) Date of Patent: Aug. 30, 2016

(54) ROUTE DETERMINATION SYSTEM

(71) Applicant: GURUNAVI, INC., Chiyoda-ku, Tokyo (JP)

(72) Inventor: Shinji Koki, Tokyo (JP)

(73) Assignee: GURUNAVI, INC., Tokyo (JP)

( * ) Notice: Subject to any disclaimer, the term of this patent is extended or adjusted under 35 U.S.C. 154(b) by 0 days.

(21) Appl. No.: 14/426,903

(22) PCT Filed: Mar. 3, 2014

(86) PCT No.: PCT/JP2014/055231
§ 371 (c)(1),
(2) Date: Mar. 9, 2015

(87) PCT Pub. No.: WO2014/156481
PCT Pub. Date: Oct. 2, 2014

(65) Prior Publication Data
US 2015/0247735 A1 Sep. 3, 2015

(30) Foreign Application Priority Data

Mar. 28, 2013 (JP) .................................. 2013-067922

(51) Int. Cl.
*G01C 21/34* (2006.01)
*G06Q 30/02* (2012.01)
(Continued)

(52) U.S. Cl.
CPC ........... *G01C 21/3492* (2013.01); *B61L 25/025* (2013.01); *G01C 21/20* (2013.01); *G06Q 30/02* (2013.01)

(58) Field of Classification Search
CPC .... G01C 21/3492; G01C 21/20; G01C 21/34; B61L 25/02; G06Q 30/02
USPC .......................................................... 701/19
See application file for complete search history.

(56) References Cited

U.S. PATENT DOCUMENTS 8,370,006 B2 * 2/2013 Kumar .................... B61L 3/006
701/19
8,862,291 B2 * 10/2014 Sharma .................. G08G 1/167
246/122 R
(Continued)

FOREIGN PATENT DOCUMENTS

JP  2001-108457 A  4/2001
JP  2009-210473 A  9/2009
(Continued)

OTHER PUBLICATIONS

Mar. 8, 2016 Search Report issued in European Patent Application No. 14772882.8.
(Continued)

*Primary Examiner* — Richard Camby
(74) *Attorney, Agent, or Firm* — Oliff PLC

(57) ABSTRACT

An object providing a route determination system that determines a railroad route used by a user, without using a system of a railroad company, includes a distance calculation processing unit, a route identification processing unit, a speed calculation processing unit, and a route determination processing unit. The distance calculation processing unit calculates a distance from each of a plurality of pieces of positional information acquired by a mobile communication terminal that is used by a user. The route identification processing unit identifies a closest route on the basis of the calculated distances. The speed calculation processing unit identifies the pieces of positional information of which the distance to the identified route is shorter than or equal to a predetermined threshold, and calculates a moving speed between positions in the identified route to which the identified pieces of positional information correspond.

10 Claims, 4 Drawing Sheets

(51) Int. Cl.
  *B61L 25/02* (2006.01)
  *G01C 21/20* (2006.01)

(56) References Cited

U.S. PATENT DOCUMENTS

| | | | |
|---|---|---|---|
| 2002/0088904 A1* | 7/2002 | Meyer | B61L 25/025 246/124 |
| 2006/0173841 A1 | 8/2006 | Bill | |
| 2009/0239552 A1 | 9/2009 | Churchill et al. | |
| 2011/0208426 A1 | 8/2011 | Zheng et al. | |

FOREIGN PATENT DOCUMENTS

| | | |
|---|---|---|
| WO | 2010/040401 A1 | 4/2010 |
| WO | 2010/119774 A1 | 10/2010 |

OTHER PUBLICATIONS

Proto Geo; "Moves for iphone;" [online]; <URL:https://moves-app.com/>; accessed Mar. 9, 2015.

* cited by examiner

ROUTE DETERMINATION SYSTEM

TECHNICAL FIELD

The invention relates to a route determination system that determines a railroad route used by a user, without using a system of a railroad company.

BACKGROUND ART

There is a case where a restaurant, and the like, along a railroad is introduced to a user of the railroad, and a point service or a coupon service is provided for the user. In this case, which railroad the user is using can be acquired from the user through a self-reported method; however, the method accompanies a user's burden of input operation. Therefore, it is conceivable to determine which railroad was used, by using entry/exit information of automatic ticket gates in an automatic ticket checking system of a railroad company.

Even when an automatic ticket checking system is not used, it is conceivable to use a system that acquires positional information from a GPS and then determines movement by transportation on the basis of the positional information, as described in the following Non-Patent Document 1.

RELATED ART DOCUMENT

Non-Patent Document

Non-Patent Document 1: Proto Geo, "Moves for iphone", [online], <URL:https://moves-app.com/>

SUMMARY OF THE INVENTION

Problem to be Solved by the Invention

When the automatic ticket checking system of a railroad company is used, it is required to enter into a tie-up with the railroad company and acquire entry/exit information of automatic ticket gates from the automatic ticket checking system of the railroad company. However, the automatic ticket checking system is an important system for the railroad company to manage users, so it is not easy to obtain permission for a usage different from the usage of the original purpose.

If permission for a usage is obtained from the railroad company, there are many railroad companies, and automatic ticket checking systems respectively used by the railroad companies vary among the railroad companies. Thus, because of the necessity to acquire entry/exit information from each railroad company, it is required to customize the system for each railroad company. A burden of the customization is heavy.

In addition, by using the application described in the above-described Non-Patent Document 1, it is possible to periodically measure a position by using a GPS function provided in a cellular phone, and then to record the measured position. It is possible to estimate the usage of transportation from a moving speed. However, it is not possible to determine whether the transportation is a railroad, a car or a bus.

Means for Solving the Problem

In light of the above-described inconvenience, the inventor invented a route determination system that is able to determine which route is used by a user, without using an automatic ticket checking system of a railroad company.

A first invention is a route determination system. The route determination system determines a railroad route that is used by a user. The route determination system includes a distance calculation processing unit that calculates distances from a plurality of pieces of positional information to a route, the plurality of pieces of positional information being acquired by a mobile communication terminal that is used by the user; a route identification processing unit that identifies a closest route on the basis of the calculated distances; a speed calculation processing unit that identifies the pieces of positional information of which the distance to the identified route is shorter than or equal to a predetermined threshold, and that calculates a moving speed between positions in the identified route to which the identified pieces of positional information correspond; and a route determination processing unit that, when the calculated moving speed satisfies a predetermined condition, determines that the user uses the identified route.

With the configuration according to the invention, it is possible to determine a railroad route that is being used by a user without using an automatic ticket checking system of a railroad company, and to determine the railroad route more accurately than when positional information acquired from a GPS is simply used.

Particularly, in the invention, in calculating a moving time, not the acquired pieces of positional information but pieces of positional information in the route to which the acquired pieces of positional information correspond are used. Thus, "a distance along the route" is allowed to be used as a distance in calculating a moving speed. For example, when a route forms a complex curve, a deviation tends to occur in distance, with the result that a deviation of the moving speed increases. However, the invention uses "a distance along the route", so the deviation is reduced, leading to improvement in accuracy.

In the above-described invention, the route determination system may be configured as follows. The route determination system stores in advance information about a region in which a plurality of routes are in parallel with each other, and, within the region, the route determination system executes at least one of positional information excluding processes, that is, at least one of not acquiring positional information by the mobile communication terminal, not transmitting acquired positional information, not storing positional information received from the mobile communication terminal, or not setting positional information as a processing target in the distance calculation processing unit.

In the above-described invention, the route determination system may be configured as follows. The route determination system stores in advance information about a region in which a road and a railroad are in parallel with each other, and, when located within the region, the route determination system executes at least one of positional information excluding processes, that is, at least one of not acquiring positional information by the mobile communication terminal, not transmitting acquired positional information, not storing positional information received from the mobile communication terminal, or not setting positional information as a processing target in the distance calculation processing unit.

When a plurality of routes are running in parallel with each other or when a road and a railroad are running in parallel with each other, an error tends to occur in determining a route that is used by a user. Therefore, by executing the processes according to the above inventions, it is possible to prevent erroneous determination.

In the above-described invention, the route determination system may be configured as follows. The route determination system further includes a result transmission processing unit that transmits information about the route, determined by the route determination processing unit, to the mobile communication terminal that is used by the user, and the route determination system causes the mobile communication terminal to display information about a shop or information about a coupon, corresponding to the information about the route, on the condition that information about a determined result, transmitted from the result transmission processing unit, is received by the mobile communication terminal.

In the above-described invention, the route determination system may be configured as follows. The route determination system further includes a result transmission processing unit that transmits information about the route determined by the route determination processing unit to a predetermined server, and the route determination system causes the predetermined server to search for information about a shop or information about a coupon, corresponding to the information about the route, on the condition that information about a determined result transmitted from the result transmission processing unit is received by the predetermined server, and causes the mobile communication terminal to display information about a shop or information about a coupon, corresponding to the information about the route, on the condition that the predetermined server is caused to transmit the search result to the mobile communication terminal.

According to these inventions, it is desirable to be able to provide a user's mobile communication terminal with information about a shop or coupon along a determined route by using information about the determined route.

Effect of the Invention

With the route determination system according to the invention, it is possible to determine which route a user is using, without using an automatic ticket checking system of a railroad company. Different from an existing positional information recording system (Non-Patent Document 1, or the like) that uses positional information and a moving speed based on the positional information, it is possible to appropriately determine that a user is using a railroad.

MODES FOR CARRYING OUT THE INVENTION

Figure 1:
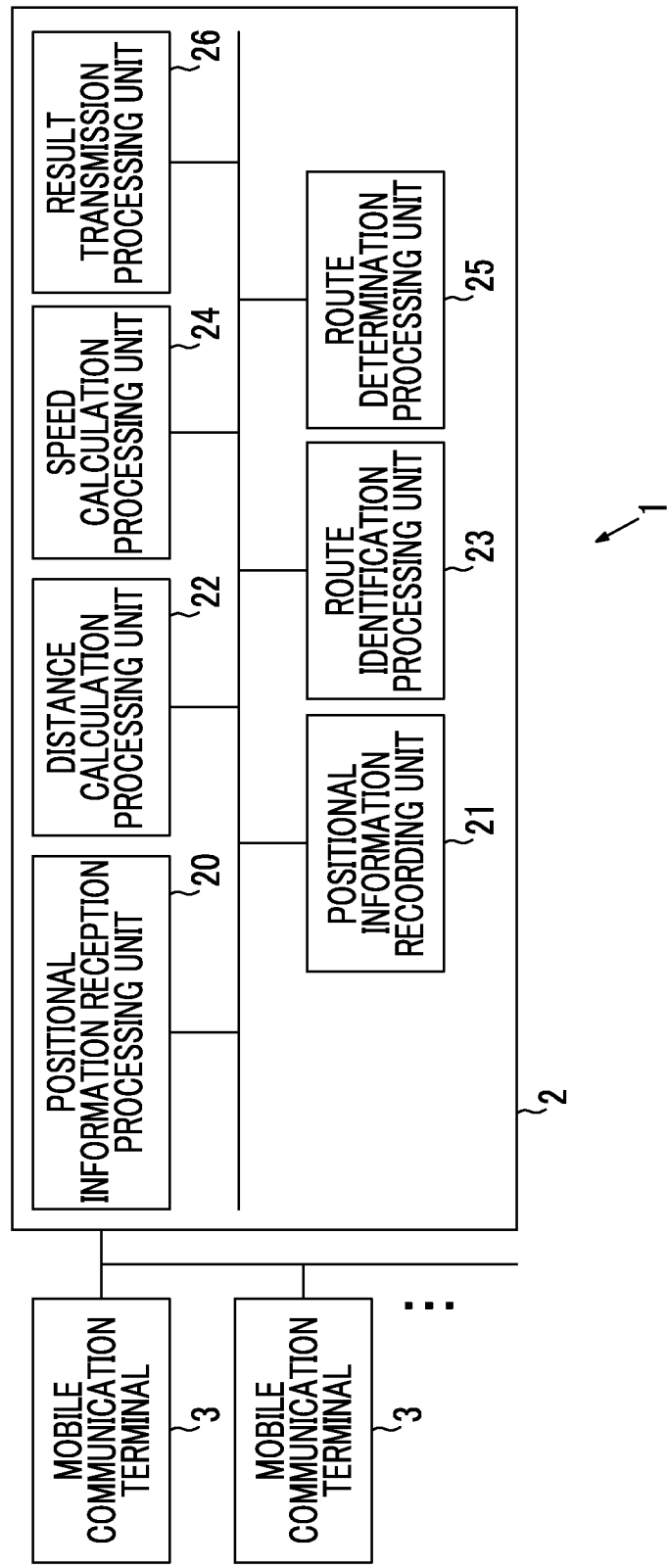
FIG. 1 is a view that schematically shows an example of the system configuration of a route determination system according to the invention.
Figure 2:
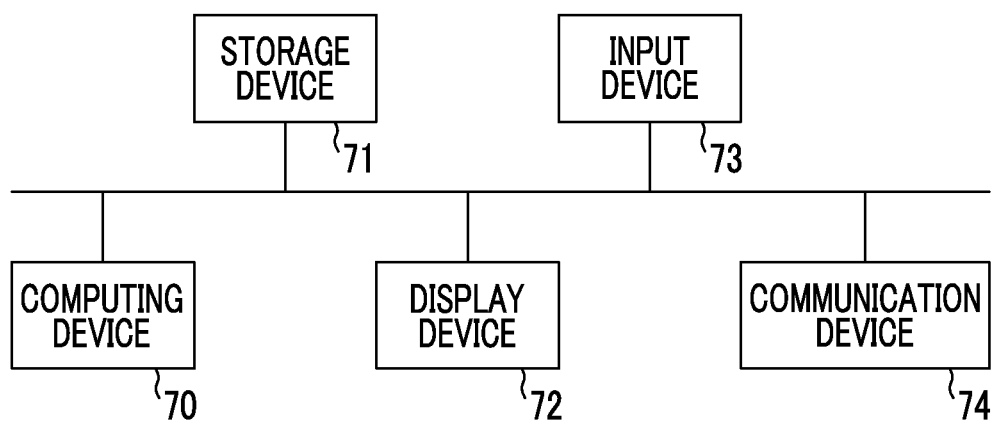
FIG. 2 is a view that schematically shows an example of the hardware configuration of a computer that is used in the invention.

FIG. 1 shows a conceptual view of an example of the system configuration of a route determination system 1 according to the invention. FIG. 2 schematically shows an example of the hardware configuration of a computer that implements the route determination system 1.

Examples of the computer include not only a portable mobile communication terminal 3, such as a cellular phone, including a smartphone, a PHS, a PDA and a tablet computer, but also a personal computer, a server, and the like.

The computer includes a computing device 70, a storage device 71, a display device 72, an input device 73, and a communication device 74. The computing device 70 is, for example, a CPU that executes an arithmetic process of a program. The storage device 71 is, for example, a RAM that stores information. The display device 72 is, for example, a display. The input device 73 includes various input interfaces, such as a mouse, a keyboard and a touch panel. The communication device 74 transmits or receives a result processed by the computing device 70 or information stored in the storage device 71 via a network, such as a public telephone line, the Internet and a LAN. The process of each function (means) implemented on the computer is executed when the means (a program, a module, or the like) for executing the process is loaded onto the computing device 70. When information stored in the storage device 71 is used in the process of the function, each function loads the corresponding information from the storage device 71, and uses the loaded information for the process in the computing device 70 as needed.

Each means in the invention is just logically distinguished from each other by function, and may be implemented in the same region physically or actually.

The mobile communication terminal 3 that is used by a user (railroad user) is a computer that is used by the user. The mobile communication terminal 3 includes not only a portable communication terminal, such as a cellular phone, including a smartphone, a PHS, a PDA and a tablet computer, but also a personal computer, and the like.

A determination server 2 in the route determination system 1 includes a positional information reception processing unit 20, a positional information storage unit 21, a distance calculation processing unit 22, a route identification processing unit 23, a speed calculation processing unit 24, a route determination processing unit 25, and a result transmission processing unit 26.

The positional information reception processing unit 20 receives positional information acquired by the mobile communication terminal 3 that is used by the user. At this time, date and time information and user identification information for identifying the user should be received together. The received positional information is stored in the positional information storage unit 21 (described later).

The positional information storage unit 21 stores the positional information and the date and time information in association with the user identification information. The positional information and the date and time information are received by the positional information reception processing unit 20. In the positional information storage unit 21, a predetermined number of pieces of the positional information received from the mobile communication terminal 3 of each user or pieces of the positional information received from the mobile communication terminal 3 of each user within a predetermined time are desirably stored.

Figure 4:
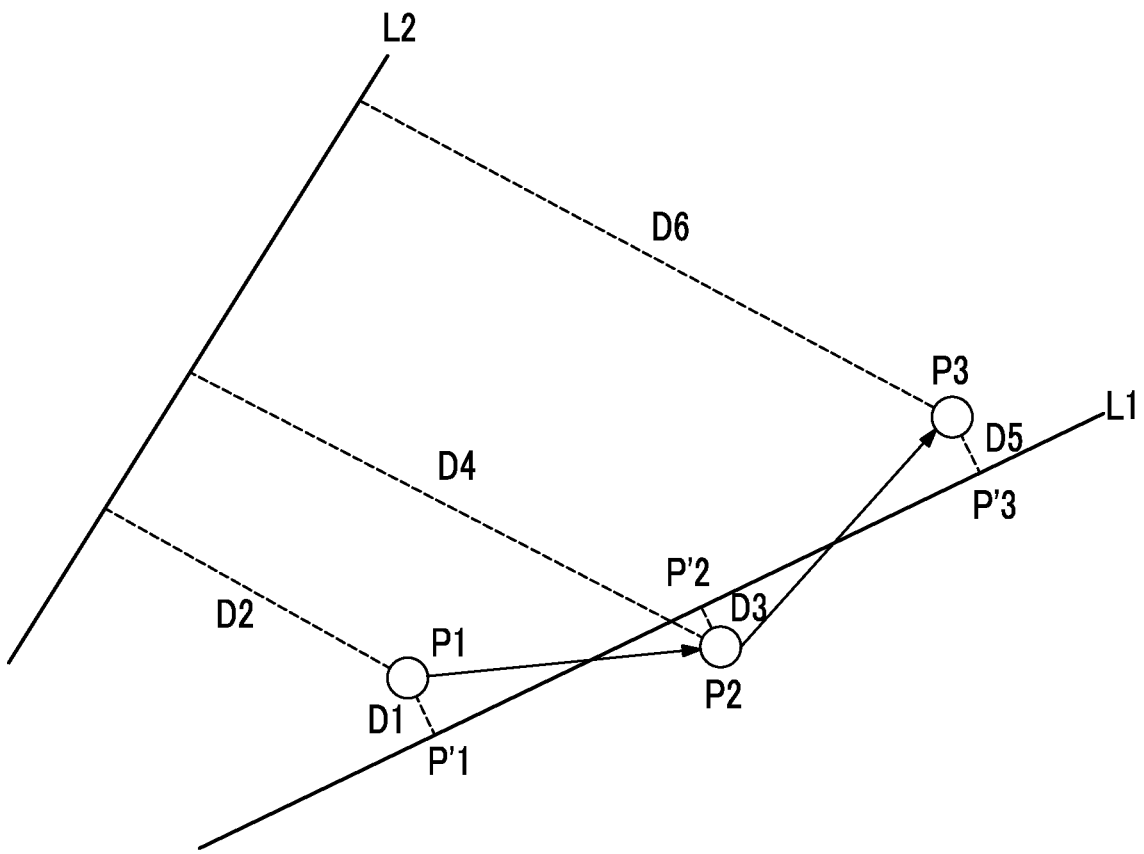
FIG. 4 is a conceptual view that schematically shows the process of identifying a route.

The distance calculation processing unit 22 extracts pieces of positional information, stored in the positional information storage unit 21, on the basis of the user identification information, and calculates a distance D from each of the pieces of positional information to each railroad route L. For example, as shown in FIG. 4, it is assumed that the pieces of positional information, acquired from the user's mobile communication terminal 3, are P1 to P3 and the routes are L1 and L2. In this case, a distance D1 from P1 to L1 (a perpendicular distance from P1 to L1 on a map), a distance D2 from P1 to L2, a distance D3 from P2 to L1, a distance D4 from P2 to L2, a distance D5 from P3 to L1 and a distance D6 from P3 to L2 each are calculated. Information about a route L is expressed as route information by connecting a plurality of points (pieces of positional information) and lines that link the points, and is stored.

The route identification processing unit 23 identifies the railroad route L closest to the pieces of positional information on the basis of the distances D calculated by the, distance calculation processing unit 22. In the above-described case, the closest route L1 for each piece of positional information (the distance D is the shortest) is identified.

The speed calculation processing unit 24 determines at each of P1 to P3 whether the distance D1, the distance D3 or the distance D5, closest to the identified route L1, is shorter than or equal to a predetermined threshold, and calculates an average moving speed between the pieces of positional information, at which the closest distance is shorter than or equal to the threshold. For example, when D1, D3, D5 are shorter than or equal to the predetermined threshold, the average moving speed from P1 to P2 and the average moving speed from P2 to P3 are calculated. That is, the average moving speed between the pieces of positional information is calculated as follows.

(Average moving speed between pieces of positional information)=Distance/Time

Therefore, initially, a moving time is calculated on the basis of the date and time information at P1 and the date and time information at P2 as a moving time from P1 to P2. A moving distance between point P'1 corresponding to P1 in L1 (a point closest to P1 in L1; where a perpendicular is drawn from P1 to L1, an intersection of the perpendicular with L1; the same applies to the other points) and point P'2 corresponding to P2 in L1 is calculated. The average moving speed from P1 to P2 is calculated through a division on the basis of the calculated moving distance and moving time.

Similarly, the average moving speed from P2 to P3 is calculated. That is, as a moving time from P2 to P3, a moving time is calculated on the basis of the date and time information at P2 and the date and time information at P3. A distance between point P'2 corresponding to P2 in L1 and point P'3 corresponding to P3 in L1 is calculated. The average moving speed from P2 to P3 is calculated through a division on the basis of the calculated moving distance and moving time.

The case where a distance between positions in the route to which the acquired pieces of positional information correspond is used in the above-described process of calculating the average moving speed is described. Instead, a distance between the acquired pieces of positional information may be used in the process of calculating the average moving speed.

When the average moving speed calculated by the speed calculation processing unit 24 falls within a prescribed range, the route determination processing unit 25 determines that the route identified by the route identification processing unit 23 is used. When the average moving speed falls outside the prescribed range, it is determined that the route identified by the route identification processing unit 23 is not used. In the above-described case, when the average moving speed between P'1 and P'2 and the average moving speed between P'2 and P'3 fall within the prescribed range, it is determined that the user is using the route L1.

When the result transmission processing unit 26 determines that the route identified by the route determination processing unit 25 is used, the result transmission processing unit 26 transmits the determined result to the user's mobile communication terminal 3. In the above-described case, when the route determination processing unit 25 determines that the route L1 is used, the result transmission processing unit 26 transmits information about the route L1 as the determined result to the user's mobile communication terminal 3.

First Embodiment

An operation process according to the invention will be described with reference to the flowchart shown in FIG. 3.

Initially, a user activates an application program for using the route determination system 1 according to the invention at predetermined timing, for example, at the time when the user gets on a train (S100). When the application program is activated, the positional information of the mobile communication terminal 3 is acquired by the GPS function of the mobile communication terminal 3 at each predetermined timing, for example, at intervals of one minute, five minutes, or the like (S110). The acquired positional information is transmitted to the determination server 2 together with the date and time information and the user identification information (S120).

The positional information transmitted from the mobile communication terminal 3 is received by the positional information reception processing unit 20 of the determination server 2, and is stored in the positional information storage unit 21 (S130).

At predetermined timing, the distance calculation processing unit 22 extracts a plurality of the pieces of positional information stored in the positional information storage unit 21 (S140), and calculates a distance D from each of the extracted pieces of positional information to each railroad route L (S150). The route identification processing unit 23 identifies the railroad route L closest to the pieces of positional information on the basis of the calculated distances D (S160).

Subsequently, the speed calculation processing unit 24 identifies the pieces of positional information of which the distance to the route L1 identified in S160 is shorter than or equal to the predetermined threshold (S170). That is, in the case of FIG. 4, it is determined whether each of the distances D1, D3, D5 at the acquired pieces of positional information P1 to P3 is shorter than or equal to the predetermined threshold. When there is no piece of positional information of which the distance is shorter than or equal to the predetermined threshold, it may be determined that the user is not using a railroad. On the other hand, when the pieces of positional information of which the distance is shorter than or equal to the predetermined threshold are identified, the average moving speed between the pieces of positional information of which the distance is shorter than or equal to the predetermined threshold is calculated (S180).

When the average moving speed falls within the predetermined range (S190), it is determined that the route L identified in S160 is used by the user (S200), and the result transmission processing unit 26 transmits the determined result to the user's mobile communication terminal 3 (S210).

In the above-described case, it may be determined that the user is using the route L1, so the result transmission processing unit 26 transmits information about the route L1 to the user's mobile communication terminal 3 as the determined result.

With the application program of the user's mobile communication terminal 3, it is possible to execute the process of, for example, extracting a coupon along the route L1 on the basis of the determined result received from the determination server 2 and displaying the coupon on the mobile communication terminal 3. By transmitting the received determined result (route L1) as a search condition to a predetermined server (for example, a server that provides information about a restaurant), information about the website, coupon, and the like, of a restaurant along the route may be acquired from the server.

With the application program of the mobile communication terminal 3, information about the route that is the determined result acquired from the determination server 2 may be stored in advance, and, when the number of times a specific route is used becomes larger than or equal to a predetermined number of times, information about a special coupon of a restaurant along the route may be allowed to be displayed. In this case, at the time when a search condition for a coupon is transmitted from the mobile communication terminal 3 to the predetermined server, information about the number of times the route is used is also transmitted. Thus, information about the number of times the route is used may be determined by the predetermined server, and, when the number of times is larger than or equal to a predetermined number of times, information about a special coupon may be transmitted to the mobile communication terminal 3.

Second Embodiment

In the first embodiment, the result transmission processing unit 26 transmits the route that is used by a user and determined in S200 to the user's mobile communication terminal 3. Instead, the result transmission processing unit 26 may transmit the determined result and the user identification information to a predetermined server (for example, a server that provides information about a restaurant) without transmitting the determined result to the user's mobile communication terminal 3. In this case, the server may be caused to search for information about the website, coupon, and the like, of a restaurant along the route, and search result information about the website, coupon, and the like, of the restaurant along the route L1 may be transmitted from the server to the mobile communication terminal 3.

Third Embodiment

In the above-described first and second embodiments, positional information is acquired from a user, and a route is determined by using the positional information. However, if all the acquired pieces of positional information are used, it is difficult to identify which route the user is using, for example, when a plurality of routes are running in parallel with each other just like a region around Tokyo Station.

Therefore, for a place in which a plurality of routes are in parallel with each other, the process of not acquiring or storing positional information from the mobile communication terminal 3, not setting the positional information as a processing target in the distance calculation processing unit 22, or the like, is desirably further executed.

For example, information about a region in which a plurality of routes are running in parallel with each other is set in advance in the application program of the mobile communication terminal 3, and the process of excluding positional information is executed in the following manner. Within the region, positional information is not acquired or positional information is not transmitted to the determination server 2 even when the positional information is acquired.

Information about a region in which a plurality of routes are running in parallel with each other is stored in the determination server 2 in advance, and the process of excluding positional information is executed in the following manner. Even when positional information is received from the mobile communication terminal 3, positional information is not stored in the positional information storage unit 21 when the positional information received by the positional information reception processing unit 20 is information within the region, or positional information is not set as a processing target when the positional information extracted by the distance calculation processing unit 22 is positional information within the region.

By providing the above process of excluding positional information, it is possible to increase the accuracy of route determination.

Fourth Embodiment

Furthermore, a road may be provided along a railroad track. In this case, when a car and a train travel at substantially the same speed if a user is moving on the road by the car, there is a possibility that it is determined that a user is using the route of the train although the user is moving by the car.

Therefore, as in the case of the above-described third embodiment, the region of a place in which a railroad and a road are in parallel with each other may be set in advance, and the process of excluding the positional information may be provided.

For example, information about the region of a place in which a railroad and a road are in parallel with each other is set in advance in the application program of the mobile communication terminal 3, and the process of excluding positional information is executed in the following manner. Within the region, positional information is not acquired or not transmitted to the determination server 2 even when the positional information is acquired.

Information about the region of a place in which a railroad and a road are in parallel with each other is stored in the determination server 2 in advance, and the process of excluding positional information is executed in the following manner. Even when positional information is received from the mobile communication terminal 3, positional information is not stored in the positional information storage unit 21 when the positional information received by the positional information reception processing unit 20 is information within the region, or positional information is not set as a processing target when the positional information extracted by the distance calculation processing unit 22 is positional information within the region.

By providing the above process of excluding positional information, it is possible to increase the accuracy of route determination.

Fifth Embodiment

In each of the above-described embodiments, the case where the determination server 2 is used is described. Instead, by providing the application program of the mobile communication terminal 3 with that function, the process of route determination may be executed without using the determination server 2.

INDUSTRIAL APPLICABILITY

By using the route determination system 1 according to the invention, it is possible to determine which route a user is using, without using an automatic ticket checking system of a railroad company. Different from an existing positional information recording system that uses positional information and a moving speed based on the positional information, it is possible to appropriately determine that a user is using a railroad.

DESCRIPTION OF REFERENCE NUMERALS

1 route determination system
2 determination server
3 mobile communication terminal
20 positional information reception processing unit 21 positional information storage unit
22 distance calculation processing unit
23 route identification processing unit
24 speed calculation processing unit
25 route determination processing unit
26 result transmission processing unit
70 computing device
71 storage device
72 display device
73 input device
74 communication device

DRAWINGS

Figure 3:
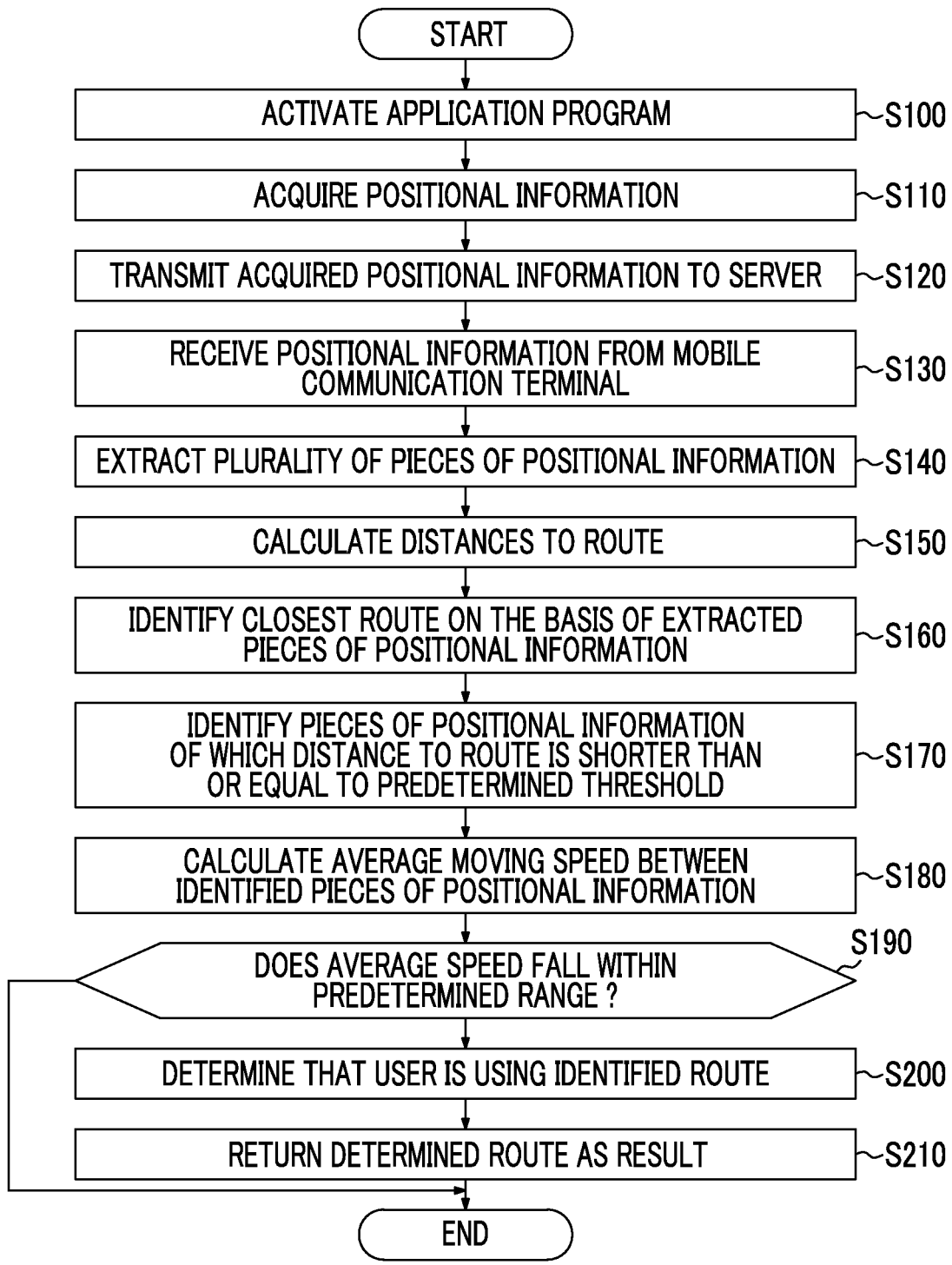
FIG. 3 is a flowchart that schematically shows an example of an operation process according to the invention.

FIG. 1
3/MOBILE COMMUNICATION TERMINAL
2/DETERMINATION SERVER
1/ROUTE DETERMINATION SYSTEM
20/POSITIONAL INFORMATION RECEPTION PROCESSING UNIT
21/POSITIONAL INFORMATION RECORDING UNIT
22/DISTANCE CALCULATION PROCESSING UNIT
23/ROUTE IDENTIFICATION PROCESSING UNIT
24/SPEED CALCULATION PROCESSING UNIT
25/ROUTE DETERMINATION PROCESSING UNIT
26/RESULT TRANSMISSION PROCESSING UNIT
FIG. 2
70/COMPUTING DEVICE
71/STORAGE DEVICE
72/DISPLAY DEVICE
73/INPUT DEVICE
74/COMMUNICATION DEVICE
FIG. 3
1/START
2/END
S100/ACTIVATE APPLICATION PROGRAM
S110/ACQUIRE POSITIONAL INFORMATION
S120/TRANSMIT ACQUIRED POSITIONAL INFORMATION TO SERVER
S130/RECEIVE POSITIONAL INFORMATION FROM MOBILE COMMUNICATION TERMINAL
S140/EXTRACT PLURALITY OF PIECES OF POSITIONAL INFORMATION
S150/CALCULATE DISTANCES TO ROUTE
S160/IDENTIFY CLOSEST ROUTE ON THE BASIS OF EXTRACTED PIECES OF POSITIONAL INFORMATION
S170/IDENTIFY PIECES OF POSITIONAL INFORMATION OF WHICH DISTANCE TO ROUTE IS SHORTER THAN OR EQUAL TO PREDETERMINED THRESHOLD
S180/CALCULATE AVERAGE MOVING SPEED BETWEEN IDENTIFIED PIECES OF POSITIONAL INFORMATION
S190/DOES AVERAGE SPEED FALL WITHIN PREDETERMINED RANGE?
S200/DETERMINE THAT USER IS USING IDENTIFIED ROUTE
S210/RETURN DETERMINED ROUTE AS RESULT

The invention claimed is:

1. A route determination system that determines a railroad route used by a user, the route determination system comprising:
a distance calculation processing unit that calculates a distance from each of a plurality of pieces of positional information to a route, the plurality of pieces of positional information being acquired by a mobile communication terminal that is used by the user;
a route identification processing unit that identifies a closest route on the basis of the calculated distances;
a speed calculation processing unit that identifies the pieces of positional information of which the distance to the identified route is shorter than or equal to a predetermined threshold, and that calculates a moving speed between the pieces of positional information of which the distance to the identified route is shorter than or equal to a predetermined threshold or calculates a moving speed between the (0032) positions in the identified route, to which the identified pieces of positional information respectively correspond; and
a route determination processing unit that, when the calculated moving speed satisfies a predetermined condition, determines that the user uses the identified route.

2. The route determination system according to claim 1, wherein
the route determination system stores in advance information about a region in which a plurality of routes are in parallel with each other, and
within the region, the route determination system executes at least one of positional information excluding processes, that is, at least one of not acquiring positional information by the mobile communication terminal, not transmitting acquired positional information, not storing positional information received from the mobile communication terminal, or not setting positional information as a processing target in the distance calculation processing unit.

3. The route determination system according to claim 1, wherein
the route determination system stores in advance information about a region in which a road and a railroad are in parallel with each other, and
within the region, the route determination system executes at least one of positional information excluding processes, that is, at least one of not acquiring positional information by the mobile communication terminal, not transmitting acquired positional information, not storing positional information received from the mobile communication terminal, or not setting positional information as a processing target in the distance calculation processing unit.

4. The route determination system according to claim 1, further comprising:
a result transmission processing unit that transmits information about the route, determined by the route determination processing unit, to the mobile communication terminal that is used by the user.

5. The route determination system according to claim 4, wherein the route determination system causes the mobile communication terminal to display information about a shop or information about a coupon, corresponding to the information about the route, on the condition that information about a determined result, transmitted from the result transmission processing unit, is received by the mobile communication terminal.

6. The route determination system according to claim 1, further comprising:
a result transmission processing unit that transmits information about the route determined by the route determination processing unit to a predetermined server.

7. The route determination system according to claim 6, wherein the route determination system causes the predetermined server to search for information about a shop or information about a coupon, corresponding to the information about the route, on the condition that information about a determined result transmitted from the result transmission processing unit is received by the predetermined server, and causes the mobile communication terminal to display information about a shop or information about a coupon, corresponding to the information about the route, on the condition that the predetermined server is caused to transmit the search result to the mobile communication terminal.

8. The route determination system according to claim 4, wherein the result transmission processing unit transmits information about the route when the number of times a specific route is used becomes larger than or equal to a predetermined number of times (0043).

9. The route determination system according to claim 6, wherein the result transmission processing unit transmits information about the route when the number of times a specific route is used becomes larger than or equal to a predetermined number of times (0043).

10. A route determination method that determines a railroad route used by a user, the route determination method characterized by comprising:

calculating a distance from each of a plurality of pieces of positional information to a route, the plurality of pieces of positional information being acquired by a mobile communication terminal that is used by the user;

identifying a closest route on the basis of the calculated distances;

identifying the pieces of positional information of which the distance to the identified route is shorter than or equal to a predetermined threshold;

calculating a moving speed between the pieces of positional information of which the distance to the identified route is shorter than or equal to a predetermined threshold or calculates a moving speed between the (0032) positions in the identified route, to which the identified pieces of positional information respectively correspond; and when the calculated moving speed satisfies a predetermined condition, determining the user uses the identified route.

\* \* \* \* \*